United States Patent
Baik et al.

(10) Patent No.: US 8,344,800 B2
(45) Date of Patent: Jan. 1, 2013

(54) REPEATING SYSTEM AND METHOD FOR CANCELLATION OF FEEDBACK INTERFERENCE SIGNAL WITH PRE-DISTORTION FUNCTION

(75) Inventors: Sung-Jun Baik, Daejon (KR); Joong-Han Choi, Daejon (KR)

(73) Assignee: Airpoint, Daejon (KR)

( * ) Notice: Subject to any disclaimer, the term of this patent is extended or adjusted under 35 U.S.C. 154(b) by 624 days.

(21) Appl. No.: 12/523,457

(22) PCT Filed: Oct. 31, 2007

(86) PCT No.: PCT/KR2007/005439
§ 371 (c)(1),
(2), (4) Date: Jul. 16, 2009

(87) PCT Pub. No.: WO2008/102943
PCT Pub. Date: Aug. 28, 2008

(65) Prior Publication Data
US 2010/0109771 A1     May 6, 2010

(30) Foreign Application Priority Data

Feb. 23, 2007  (KR) .................. 10-2007-0018530
Jun. 27, 2007  (KR) .................. 10-2007-0063887

(51) Int. Cl.
*H03F 1/26*     (2006.01)
(52) U.S. Cl. ........ 330/149; 455/114.3; 455/69; 455/24; 455/63.1; 375/296; 375/285; 375/148; 375/211

(58) Field of Classification Search .................. None
See application file for complete search history.

(56) References Cited

U.S. PATENT DOCUMENTS

| 5,428,831 | A | * | 6/1995 | Monzello et al. ............ 455/296 |
| 2002/0101938 | A1 | * | 8/2002 | Horaguchi et al. ........... 375/297 |
| 2004/0017257 | A1 | * | 1/2004 | Kim ............................ 330/149 |
| 2004/0179629 | A1 | | 9/2004 | Song et al. |
| 2005/0101277 | A1 | * | 5/2005 | Narayan et al. ............ 455/232.1 |
| 2006/0153283 | A1 | * | 7/2006 | Scharf et al. ................. 375/148 |
| 2007/0153884 | A1 | * | 7/2007 | Balasubramanian et al. 375/221 |

FOREIGN PATENT DOCUMENTS

JP     11-112400     4/1999
(Continued)

OTHER PUBLICATIONS

Office Action issued from Japanese Patent Office on Jan. 18, 2011.

*Primary Examiner* — Duc Nguyen
*Assistant Examiner* — Fanghwa Wang
(74) *Attorney, Agent, or Firm* — IP & T Group LLP

(57) ABSTRACT

There is provided a repeating system for cancellation of a feedback interference signal, including: a PA (Power Amplifier) for power-amplifying an output signal; a feedback ICS (Interference Cancellation System) for canceling a feedback interference signal and detecting a residual error; a pre-distorter for compensating for an error of the PA by applying pre-distortion and compensating for the residual error by using information on the residual error detected by the feedback ICS to linearize the characteristic of the PA; and a control unit for controlling the feedback ICS and the pre-distorter.

17 Claims, 8 Drawing Sheets

FOREIGN PATENT DOCUMENTS

| | | |
|---|---|---|
| JP | 2003-133978 | 5/2003 |
| JP | 2006-108969 | 4/2006 |
| KR | 1020010090039 A | 10/2001 |
| KR | 1020030094460 A | 12/2003 |
| KR | 1020040056800 A | 1/2004 |
| KR | 1020040054420 A | 6/2004 |
| KR | 1020040071557 A | 8/2004 |
| KR | 1020040102635 A | 12/2004 |
| KR | 1020050064485 A | 6/2005 |
| KR | 1020060072077 A | 6/2006 |

\* cited by examiner

REPEATING SYSTEM AND METHOD FOR CANCELLATION OF FEEDBACK INTERFERENCE SIGNAL WITH PRE-DISTORTION FUNCTION

This application is a national stage application of PCT/KR2007/005439 filed on Oct. 31, 2007, which claims priority of Korean patent application number 10-2007-0018530 filed on Feb. 23, 2007 and Korean patent application number 10-2007-0063887 filed on Jun. 27, 2007. The disclosure of each of the foregoing applications is incorporated herein by reference in its entirety.

TECHNICAL FIELD

The present invention relates to a radio repeating system; and more particularly, to a radio repeating system and method with a pre-distortion function, which cancel a feedback interference signal by using an ICS (Interference Cancellation System) technique and linearize the characteristic of a PA (Power Amplifier) by using a pre-distortion technique, and a computer-readable recording medium that records a software program for realizing the method.

BACKGROUND ART

Generally, a radio communication system employs a repeating system if normal services are not provided to terminals because a radio signal transmitted from a base station is weak due to a far distance from the base station, or obstacles such as topographical effects or construction structures, etc., or for service coverage expansion of the base station.

The repeating system typically includes a repeating apparatus having two antennas (a donor antenna and a service antenna) and a PA, wherein the donor antenna communicates signals with a base station and the service antenna communicates signals with terminals.

Further, the repeating system is classified into an optical repeater, an RF repeater, a frequency changing repeater, a microwave repeater and the like depending on how to transmit a signal from a base station to a repeating apparatus. Among these, while the RF repeater is a most cost effective and simple method, it causes oscillations due to a phenomenon, in which a relay signal transmitted through the service antenna is feedbacked and applied to the donor antenna, and thus cannot be normally used.

There are numerous conventional techniques for the RF repeater to remove this feedback interference signal. One of those techniques will be described below with reference to FIG. 1.

FIG. 1 is a block diagram illustrating a bidirectional structure of a conventional RF repeating system.

As shown in FIG. 1, a signal received through a donor antenna 100 (or service antenna 180) is inputted to a filter and signal processor 120 or 160 contained in an RF repeating apparatus 130. Then, the filter and signal processor 120 or 160 removes undesired band components and the signal is amplified by a LNA (Low Noise Amplifier) 140 or 150 prepared at a next stage. The low noise amplified signal is then applied to a duplexer 170 or 110 which is an output amplifier, wherein the output amplifier again amplifies the signal and radiates it in the air through the service antenna 180 or donor antenna 100.

In addition to the above conventional techniques, Korean Patent Application No. 10-2001-0050193 discloses a method for canceling a feedback interference signal by applying a signal processing technique to a received RF signal. Further, Korean Patent Application Nos. 10-2003-0034160 and 10-2005-0127580 improve both flexibility of signal processing and environment adaptation by processing a feedback interference signal using a digital signal processing technique for cancellation thereof in a manner that an RF signal is converted into a baseband signal to remove a feedback interference signal and back into an RF signal for its transmission.

Meanwhile, in the repeating system, an amplifier that amplifies a signal (relay signal) to be transmitted is provided with an LNA and a PA. The main purpose of the LNA is to remove noises. On the other hand, the PA largely amplifies an input signal to provide a high output, rather than removing noises, for high efficiency, but generates much heat. The gain of the PA is defined as a ratio of the amplitude of an input signal to that of an output signal, and is not linearly varied with the amplitude of the input signal but becomes small when the output signal is near to a saturation region.

Further, the difference between the input signal and the output signal of the PA is referred to as distortion. And, when different frequency signals are inputted as input signals, inter modulation occurs between the frequencies, thereby generating, in the output signal, mixed other frequency components that do not exist in the input signal. This is referred to as nonlinear distortion. Otherwise, distortion caused by the amplitude of the signal is referred to as linear distortion. The distortion generated by the PA is classified into an amplitude distortion where amplitude is distorted by the amplitude of the input signal and a phase distortion where phase is distorted by the phase thereof. The nonlinear distortion is greatly generated at a saturation region point where the gain of the PA is maximized. The simplest method for avoiding this is a method that makes the amplitude of the input signal small so that the PA operates enough below the saturation region.

However, if the amplitude of the input signal is small, the efficiency of the PA becomes lower. Meanwhile, in order to improve the nonlinearity of the PA, there have been introduced a feedforward method, a feedback method, a pre-distortion method, etc. As known prior arts, there are Korean Patent Application Nos. 10-2002-0081455, 10-2003-00095905, 10-2002-0031332, 10-2002-0083377, and 10-2003-0007604.

Meanwhile, the non-memory effect is that the output signal of the PA is determined depending on a current input signal only, while the memory (storage) effect refers to characteristic that causes distortion of the PA by nonlinear characteristic thereof by the amplitudes of a signal previously stored in a circuit and a current input signal. The memory effect may be ignored in narrowband where the bandwidth of the input signal is smaller than that of the PA (output amplifier), but becomes very large by frequency differences of input signals in wideband like OFDM (Orthogonal Frequency Division Modulation).

The recent standards for radio communication technologies adopt next generation communication methods using wideband and multi-carriers, and thus, the memory effect greatly appears in the PA. In the feedforward method that has been generally used in the repeating system, the memory effect is offset in course of adding an error signal given by difference between an output signal and an input signal of a primary amplifier. Accordingly, the memory effect does not almost appear, and linearization range is large, and a spurious signal by inter modulation can be effectively removed, so the feedforward method has been widely used in the repeating system up to now.

In case of wideband as set forth above, however, the efficiency of the PA is lower, and the primary amplifier that processes a primary signal and a secondary amplifier that process an error signal are made in an open loop form, thereby making the structure thereof complicated and being sensitive to the characteristic of each device due to necessity of control at the RF end. Especially, with the advancement of semiconductor technology, since the price of high integrated chips and processors such as FPGA (Field Programmable Gate Array) and DSP (Digital Signal Processing) decreases, it becomes possible to implement the baseband pre-distortion technology that processes a baseband signal with the DSP technology.

In order to employ such DSP technology, however, an analog signal of RF band is demodulated into a digital signal and processed by the DSP technology. Then, this is modulated back into an analog signal and inputted to the PA, thereby rendering the implementation thereof complicated and in turn failing to widely use due to price increase by such complicated implementation.

Further, the recent radio communication technology requires the efficient utility of spectrum in order to accommodate many subscribers and support a high communication speed, and thus uses wideband and multi-carrier and a combination of phase and amplitude modulations. In the OFDM that has been recognized as the standard for next-generation radio communication technology, not single sub-carrier but multi sub-carrier is used, so bandwidth is wideband and it exhibits high PAPR (Peak to peak Average Power Ratio) characteristics. Due to this, there are large distortions of the PA by the memory effect and by wideband.

Meanwhile, the distortion of the PA is varied with environments around the repeater, such as deterioration with the lapse of time, temperature, power, and frequency variations by temperature, which causes a large nonlinear phenomenon due to the distortion of the PA. Thus, the PA needs to operate adaptively to various environments.

The conventional linearization technology of the PA set forth above linearizes distortion in order to faithfully amplify an input analog signal, and considers the influence by temperature that is one of causes of the memory effect.

The compensation by such temperature, however, employs a narrow thermal noise compensation technique that reflects temperature around the PA or ambient temperature by the level of input signal, not the narrow PA itself, and thus has the limitations in widespread thermal noise compensation, including ambient radio wave environments, processing gain, system limit, etc. Especially, although the PA is faithfully designed to have linear characteristic, it has the limitations that do not reflect processing limits such as quantization noise caused by the finite of LUT (Look-Up Table), modeling limit, and residual error caused by compromise between the hardware processing speed limit and complexity of implementation, or any error in variations of ambient environments.

Moreover, high output is required to maximize the operation efficiency of the repeating system and a small-sized and lightweight device is required for convenience of installation and maintenance. However, the temperature of PA rises as the output becomes large, and thus the performance of the repeating system is degraded if heat is not effectively radiated to outside, thereby leading to an increase in size and cost due to attachment of a fan for heat radiation.

DISCLOSURE

Technical Problem

It is, therefore, an object of the present invention to provide a radio repeating system and method with a pre-distortion function, which cancel a feedback interference signal by using an ICS (Interference Cancellation System) technique and linearize the characteristic of a PA (Power Amplifier) by using a pre-distortion technique, and a computer-readable recording medium that records a software program for realizing the method.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a repeating system for cancellation of a feedback interference signal, including: a PA (Power Amplifier) for power-amplifying an output signal; a feedback ICS (Interference Cancellation System) for canceling a feedback interference signal and detecting a residual error; a pre-distorter for compensating for an error of the PA by applying pre-distortion and compensating for the residual error by using information on the residual error detected by the feedback ICS to linearize the characteristic of the PA; and a control unit for controlling the feedback ICS and the pre-distorter.

In accordance with another aspect of the present invention, there is provided an operation method of a repeating system for cancellation of a feedback interference signal, including the steps of: a) stopping the operation of a pre-distorter, initializing a feedback ICS, and operating the feedback ICS in normal mode to continuously update feedback interference cancellation coefficients; b) initializing a closed loop of the pre-distorter and primarily calculating pre-distortion coefficients, and initializing an open loop while applying pre-distortion by using the calculated pre-distortion coefficients to acquire residual error information; and c) converting the pre-distorter into normal mode to update the pre-distortion coefficients and the residual error coefficients.

In accordance with another aspect of the present invention, There is provided a repeating system for cancellation of a feedback interference signal, including: a PA for power-amplifying an output signal; a feedback ICS for canceling a feedback interference signal existing in a relay signal; a pre-distorter for compensating for nonlinearity of the PA by using pre-distortion to linearize the characteristic of the PA; and a control unit for controlling the feedback ICS and the pre-distorter.

In accordance with another aspect of the present invention, there is provided a housing for accepting circuits with which an analog circuit unit and a digital circuit unit are linked, wherein the analog circuit unit is disposed on at least one first printed board, the digital circuit unit is disposed on at least one second printed board, and the housing is divided into a plurality of acceptors by using a conductive accepting surface for radiating heat generated from the digital circuit unit and the analog circuit unit, the digital circuit unit and the analog circuit unit being accepted in one of the acceptors for easy heat radiation in the conductive accepting surface.

ADVANTAGEOUS EFFECTS

As described above and will be set forth below, the present invention can cancel a feedback interference signal by using a feedback ICS technique and linearize the characteristics of a PA by using a pre-distortion technique.

In other words, the present invention primarily takes a pre-distortion through a closed loop consisting of an internal feedback circuit of a pre-distorter in order to linearize the PA, and then secondarily compensates for a widespread thermal noise that is not compensated for in the primary pre-distortion by extracting a residual error that remains in a feedback ICS by using a feedback interference signal received through an open loop consisting of a PA, a service antenna and a donor antenna, and transferring residual error information to the pre-distorter for secondary compensation, thereby removing a distortion caused by a comprehensive residual error that occurs in the PA.

Like this, the present invention cancels a feedback interference signal that is radiated through the service antenna of the repeating system and feedbacked to the donor antenna, and absorbs and processes a residual distortion that is not absorbed and processed in the pre-distorter. By doing so, the present invention enables the cancellation of the feedback interference signal adaptively to variations of radio wave environments around the repeating system, comprehensively reflects compensation for nonlinearity of the PA, thereby increasing the efficiency of the PA and also improving the flexibility of maintenance of the repeating system.

Namely, the conventional PA linearization modeling technique including a pre-distorter and a PA has the limitation that inevitably contains some degree of errors due to processing time, complexity of hardware or implementation, and the like, while the present invention collectively detects a widespread residual error occurred, which is not processed by the pre-distorter, at the feedback ICS, and provides residual error information to the control unit and the pre-distorter to update an LUT. Thus, the present invention cancels the feedback interference and at the same time comprehensively compensates for the nonlinearity distortion of the PA, thereby preventing oscillations by feedback of the repeating system and increasing the efficiency of the PA to decrease heat generated by the PA. In result, the present invention can provide an economical repeating system, and improve maintenance and reliability thereof.

In addition, the present invention presents the acceptor unit in order to minimize the influence between functions and addition and combination of circuit components, and reflects in the repeating system a variety of factors such as the configuration of housing for radiation of heat having a large effect on the operation of the repeating system to outside, and a connection manner between the housing and the acceptors and their arrangement, the flexibility of maintenance of the repeating system, and arrangement to minimize electric effect between the acceptors, thereby making the maintenance of the repeating system easier, minimizing the electric effect between the acceptors, and efficiently radiating heat.

BEST MODE FOR THE INVENTION

Figure 1:
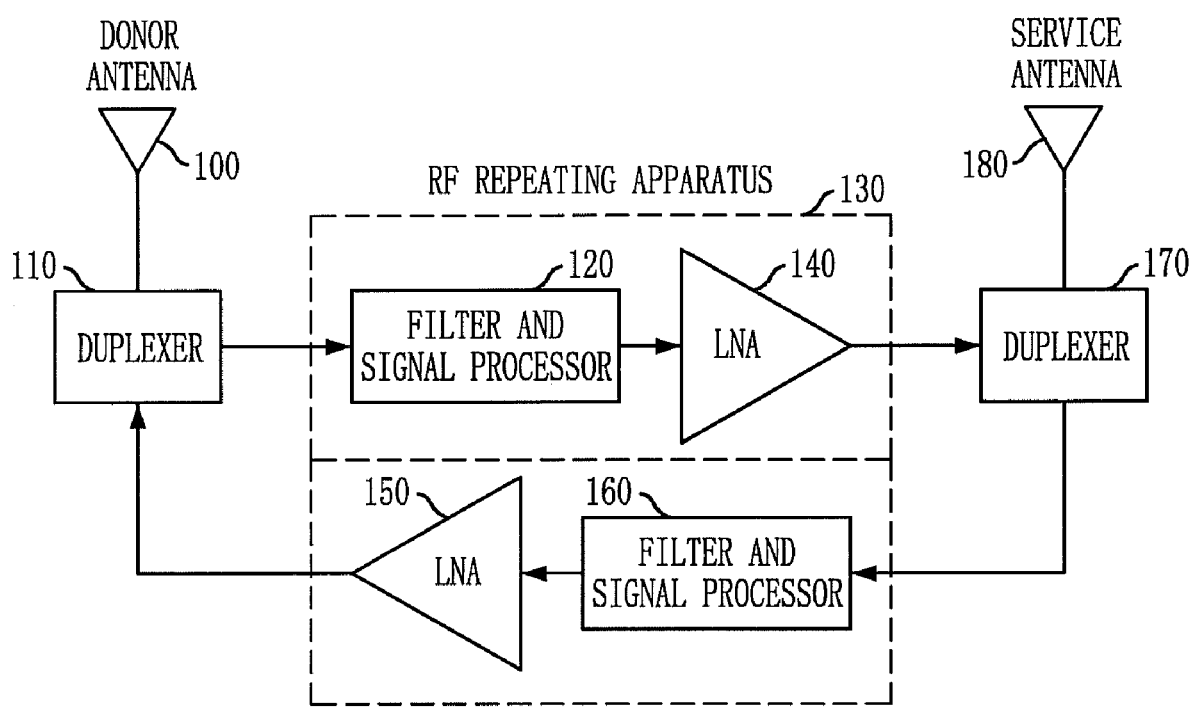
FIG. 1 is a block diagram illustrating a bidirectional structure of a conventional RF repeating system.

The advantages, features and aspects of the invention will become apparent from the following description of the embodiments with reference to the accompanying drawings, which is set forth hereinafter, so that those skilled in the art will easily carry out the present invention. Further, in the following description, well-known arts will not be described in detail if it seems that they could obscure the invention in unnecessary detail. Hereinafter, a preferred embodiment of the present invention will be described in detail with reference to the accompanying drawings.

First, the concept of the present invention will be described below.

In general, a repeating system is divided into forward and backward depending on the direction of signal transfer. The forward indicates the direction from a base station to a terminal, wherein a signal from the base station to the terminal is received by a donor antenna and transmitted to the terminal through a repeating procedure of the repeating system via a service antenna. The backward indicates the direction from a terminal to a based station, wherein a signal from the terminal to the base station is received by a service antenna and transmitted to the base station through a repeating procedure of the repeating system via a donor antenna. Since the forward and backward as set forth above are the same in repeating procedure except for the signal transmission direction, the following operation principle will be described with respect to the forward only.

The present invention largely includes a feedback ICS for canceling a feedback interference signal and detecting a residual error, a pre-distorter for pre-distorting an input signal, and a control unit for controlling and interfacing the feedback ICS and the pre-distorter.

At this time, the pre-distorter primarily derives pre-distortion coefficients required for pre-distortion through an internal closed loop consisting of a coupler, a PA, an attenuator, a baseband converter, a training unit, a control unit, and an LUT, and stores them in the LUT. An output of the PA resulting from the pre-distortion with the primarily derived pre-distortion coefficients does not have precise linearity due to quantization noise, modeling limit, implementation limit, and limitations such as ambient environments, to thus generate a residual error and transmit it to the service antenna.

The residual error so generated is feedbacked to an open loop consisting of the service antenna, the donor antenna, and the repeating system and inputted to the feedback ICS together with the feedback interference signal. Then, the feedback ICS detects the residual error that is not processed by the pre-distorter as well as canceling the feedback interference signal, and provides the corresponding information to the control unit. Based on the residual error information, the control unit controls the pre-distorter. By this, the pre-distorter secondarily calculates residual error coefficients on the basis of the residual error information and stores them in the LUT. By pre-distorting the input signal using this information, widespread thermal noises including quantization noise, adjacent channel interference, etc. can be removed.

That is, the present invention primarily performs pre-distortion in a closed loop consisting of an internal feedback circuit of the pre-distorter to linearize the PA, detects a residual error in the feedback ICS by using a feedback interference signal received through an open loop consisting the PA, the service antenna, and the donor antenna through which widespread thermal noises that are not compensated in the primary pre-distortion is transmitted, and delivers the residual error information to the pre-distorter for secondary fine compensation. By dosing so, the distortion by a comprehensive residual error generated by the PA can be resolved.

Now, the detailed configuration and operation of the present invention will be described in detail with reference to FIGS. 2 and 3.

Figure 2:
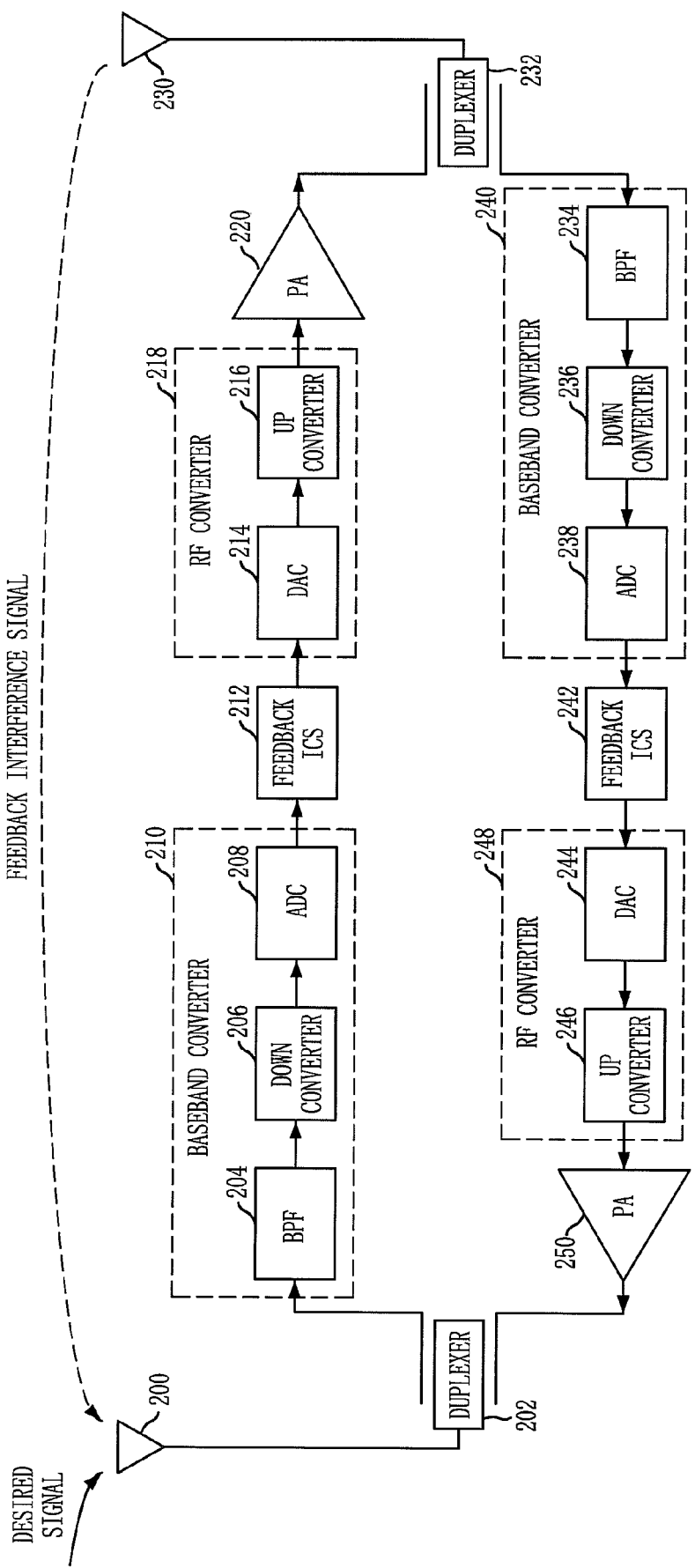
FIG. 2 is an overall block diagram illustrating a repeating system for cancellation of a feedback interference signal to which the present invention is applied.

FIG. 2 is an overall block diagram illustrating a repeating system for cancellation of a feedback interference signal to which the present invention is applied. As shown in FIG. 2, the repeating system of the invention further includes feedback ICSs 212 and 242 of a digital type for removing a feedback interference signal in the RF repeating system of FIG. 1.

That is to say, a signal received through a donor antenna 200 is converted into a digital baseband signal by a baseband converter 210. More specifically, the baseband converter 210 is provided with a BPF (Band Pass Filter) 204 for passing only a signal of desired band, a down converter for down-converting the frequency of signal filtered by the BPF 204 into an intermediate frequency, and an ADC (Analog to Digital Converter) 208 for converting an analog signal down-converted into the intermediate frequency by the down converter 206 into a digital signal of baseband.

The digital baseband signal outputted from the baseband converter 210 is processed by the feedback ICS 212 to remove a feedback interference signal and then inputted to an RF converter 218.

Then, the RF converter 218 converts the digital baseband signal, which the feedback interference signal is cancelled, into an RF signal and transmits it through a service antenna 230. To be more specific, the RF converter 218 serves to perform the reverse function of the baseband converter 210, and is provided with a DAC (Digital to Analog Converter) 214 for converting the digital baseband signal from the feedback ICS 212 into an analog signal and an up converter 216 for up-converting the analog signal from the DAC 214 into an RF signal.

Next, the RF signal from the up converter 216 is sufficiently power-amplified by a PA 220 and sent to the service antenna 230 through a duplexer 232.

Figure 3:
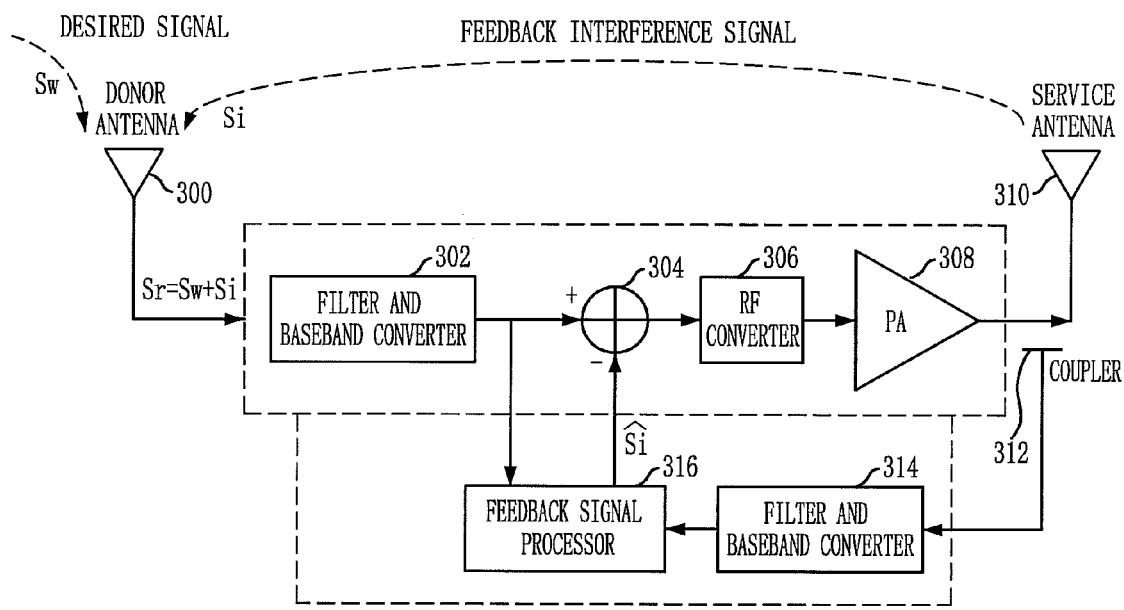
FIG. 3 is a configuration diagram of a repeating system for cancellation of a feedback interference signal using a digital signal processing technique.

FIG. 3 illustrates a configuration diagram of a repeating system for cancellation of a feedback interference signal using a digital signal processing technique, wherein a baseband converter and an RF converter are identical to those shown in FIG. 2.

In FIG. 3, Sw is a signal which is received from a base station, amplified by a repeater, and is to be provided to a service antenna 310, i.e., a signal to be repeated, and Si is a signal which is a feedback interference signal that is received again by a donor antenna 300 through a feedback channel after radiating through the service antenna 310, and has to be cancelled. And Sr is a signal which is received through the donor antenna 300, and having a desired relay signal and a undesired feedback interference signal exist at the same time.

The relationship between these signals are defined by:

$$Sr = Sw + Si \qquad \text{Eq. (1)}$$

In general, since Sw and Si cannot be distinguished directly from a received signal Sr, it is implemented in a manner that the feedback interference signal Si is predicted by feedbacking a part of the signal amplified by the PA 308 through a coupler 312 at an output end where the signal is outputted to the service antenna 310, and applying it to a feedback signal processor 316 through a filter and baseband converter 314. The feedback signal processor 316 generates a feedback interference prediction signal $\hat{S}_i$ by using the feedback signal received through the above feedback loop and the signal received from the donor antenna 300, and inputs it to an adder 304 for cancellation of the feedback interference signal. An output of the adder 304 is represented as follows:

$$Sm = Sr - \hat{S}_i = (Sw + Si) - \hat{S}_i \qquad \text{Eq. (2)}$$

Here, if the feedback interference signal and the feedback interference prediction signal are the same, i.e., if the condition $Si = \hat{S}_i$ s satisfied, the feedback interference signal is cancelled. An example thereof is disclosed in Korean Patent Application Nos. 10-2003-0034160 and 10-2005-0127580.

Figure 4:
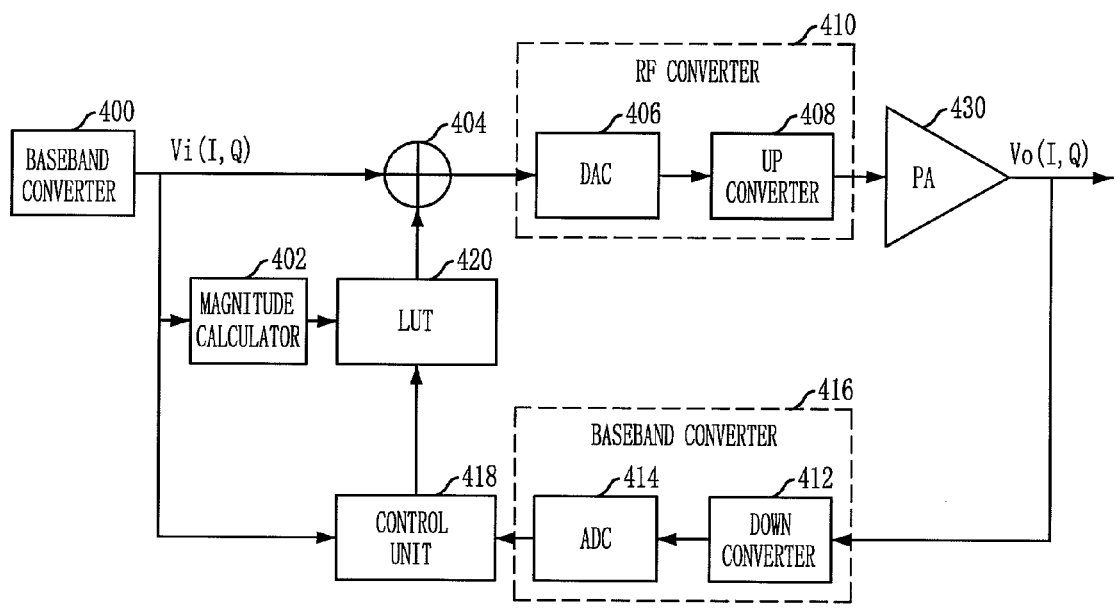
FIG. 4 is a diagram for explaining the configuration of a PA having a pre-distortion function in accordance with the present invention.

FIG. 4 is a diagram for explaining the configuration of a PA with a pre-distortion function in accordance with the present invention.

As shown in FIG. 4, the magnitude of a signal passing through the a baseband converter 400 is calculated by a magnitude calculator 402, pre-distorted by referring to an LUT 420, and then applied to an adder 404. Then, the adder 404 cancels the feedback interference signal by using the signal from the baseband converter 400 and the signal pre-distorted by referring to the LUT 420. Thereafter, a signal passing through the adder 404 is converted back into an RF signal by the RF converter 410 and outputted through the PA 430. Next, a part of the signal outputted from the PA 430 is branched off by the coupler, feedbacked back to the feedback loop (the baseband converter), and then processed by the control unit 418 to be used in updating the coefficients of the LUT 420. Other components will be described below in more detail with reference to FIG. 5.

Figure 5:
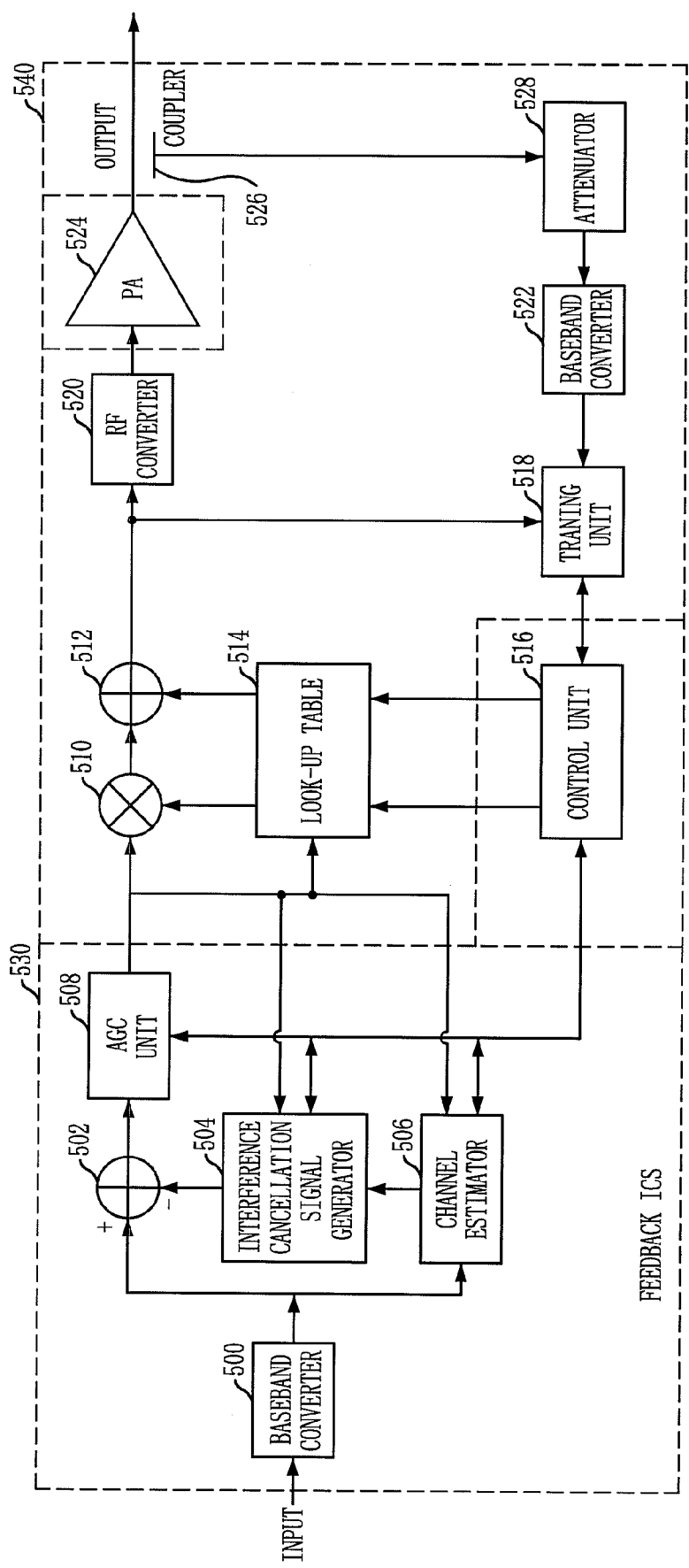
FIG. 5 is a block diagram illustrating the configuration of a repeating system for cancellation of a feedback interference signal having a pre-distortion function in accordance with the present invention.

FIG. 5 is a block diagram illustrating the configuration of a repeating system for cancellation of a feedback interference signal having a pre-distortion function in accordance with the present invention, wherein a pre-distorter is incorporated in the repeating system.

In the structure shown in FIG. 5, the detailed configuration and operation of baseband converters 500 and 522 and an RF converter 420 are the same as set forth above, and therefore, a detailed description thereof will be omitted here. It should be noted that the description for FIG. 5 is for configuration thereof but the operation order thereof may be differently described.

As shown in FIG. 5, the repeating system for cancellation of a feedback interference signal having a pre-distortion function in accordance with the invention includes a PA 524 for power-amplifying an output signal, a feedback ICS 530 for processing a feedback interference signal for cancellation thereof and detecting a residual error that remains after primary compensation in a pre-distorter 540 through an open loop to provide residual error information, the pre-distorter 540 for compensating for an error (e.g., narrow thermal noise) of the PA 524 by primary pre-distortion through an internal closed loop and secondarily fine-compensating for the residual error (which is widespread thermal noise that is not compensated in the primary pre-distortion) by using the information on residual error detected by the feedback ICS 530 to linearize the characteristic of the PA 524, and one control unit 516 for communicating control information (control data and control signals) between the feedback ICS 530 and the pre-distorter 540 and controlling the components.

The control unit 516 organically controls the feedback ICS 530 and the pre-distorter 540 so that they perform the above-mentioned functions (see FIG. 6 to be described later), and carries out the interface function and further the functions of distributing and sharing the control signals and control data therebetween. At this time, the control unit 516 is implemented with one digital signal processing device for controlling the feedback ICS 530 and the pre-distorter 540.

Further, the feedback ICS 530 detects a residual error generated by the technical limitations of operation environment or implementation of pre-distortion function through an open loop and provides corresponding residual error information to the pre-distorter 540 through the control unit 516, so that the pre-distorter 540 removes the residual error (which is the widespread thermal noise that is not compensated in the primary pre-distortion) by secondary fine compensation.

For this, the feedback ICS 530 is provided with a baseband converter 500 for converting a received signal (including a relay signal and a feedback interference signal) into a baseband signal, an AGC (Automatic Gain Control) unit 508 for automatically adjusting the amplitude of an output signal of the relay signal to be relayed to control the entire gain of the repeating system, a channel estimator 506 for detecting (or estimating) feedback interference signal information (amplitude, phase, delay time, etc.) by using the baseband signal from the baseband converter 500 and the feedback signal from the AGC unit 508, and detects the residual error that remains after primary compensation by the pre-distorter 540 and delivers the residual error information to the control unit 516, an interference cancellation signal generator 504 for generating an interference cancellation signal to be used to cancel the feedback interference signal based on the feedback interference signal information detected by the channel estimator 506 and the feedback signal from the AGC unit 508, and an adder (feedback ICS) 502 for removing the feedback interference signal existing in the baseband signal from the baseband converter 500 by using the interference cancellation signal from the interference cancellation signal generator 504, and delivers the same to the AGC 508.

The control unit 516 controls related components so that they generate a reference signal when necessary or at regular intervals in order to compensate for the residual error or remove the feedback interference signal. The reference signal to be generated is radiated through the PA 524 via the service antenna 310, wherein its phase φ and amplitude A are varied by passing through the channel and any delay τ occurs therein. The signal so varied and delayed is feedbacked and received by the donor antenna 300.

Meanwhile, a received signal (including the feedback interference signal) passing through the donor antenna 300 is converted into a digital baseband signal through the baseband converter 500 and then fed to the channel estimator 506 and the adder 502. Then, at the channel estimator 506, an output signal (or a signal received from a first closed loop consisting of the coupler 526, the attenuator 528, and the baseband converter 500) for the AGC unit 508 and the baseband signal (including the feedback interference signal) from the baseband converter 500 are compared to measure an amplitude, a phase and a delay time. Then, feedback interference signal information is delivered to the interference cancellation signal generator 504, and a residual error that remains after primary compensation in the pre-distorter 540 is calculated to deliver the residual error information to the control unit 516.

The interference cancellation signal generator 504 generates an interference cancellation signal (inverse feedback interference signal) whose amplitude is equal to that of the feedback interference signal but phase is different from it by 180 degree by employing the feedback interference signal information such as amplitude, phase and delay time, and the feedback signal from the AGC unit 508. The interference cancellation signal thus generated is then applied to the adder 502.

Then, the adder 502 adds the baseband signal from the baseband converter 500 and the interference cancellation signal from the interference cancellation signal generator 504 to cancel the feedback interference signal that exists within the baseband signal from the baseband converter 500 and output a signal excluding the feedback interference signal to the AGC unit 508. Needless to say, when the signal received through the donor antenna 300 is inputted to the adder 502 through the baseband converter 500, the signal should be delayed by the time that is taken for the signal processing at the channel estimator 506 and the interference cancellation signal generator 504 at the front end of the adder 502, and then inputted to the adder 502.

While the known technique branches off part of the signal passing through the PA 524 and converts the part of signal so branched off back into a digital baseband signal through the baseband converter 522, the present invention directly feed-backs the signal at the output end of the AGC unit 508 and thus omits the process of converting the baseband signal into the RF signal and converting this back into the baseband signal, thereby reducing processing delay time and processing error.

Meanwhile, the pre-distorter 540 of the invention is composed of a second closed loop including a loop-table 514, combiners 510 and 512, an RF converter 520, a PA 524, a coupler 526, an attenuator 528, a baseband converter 522, a training unit 518, and a control unit 516. Among the components, the components excepting the PA 524 organically operate as below and perform the pre-distortion function of primarily compensating for an error (narrow thermal noise) of the PA 524.

In other words, the pre-distorter 540 includes the combiners 510 and 512 for combining pre-distortion coefficients or residual error coefficients stored in the LUT 514 and an output signal from the AGC unit 508, the RF converter 520 for converting a digital baseband signal from the combiners 510 and 512 into an RF signal to provide a converted signal to the PA 524, the coupler 526 for branching off and feedbacking part of the output signal of the PA 524, the attenuator 529 for attenuating a feedback signal branched off and feedbacked by the coupler 526, the baseband converter 522 for converting the RF signal attenuated by the attenuator 529 into a digital baseband signal, the training unit 518 for calculating pre-distortion coefficients by using an output signal of the baseband converter 522 and an output signal of the combiners 510 and 512, and calculating residual error coefficients based on the residual error information provided from the feedback interference signal canceller 530 through the control unit 516, and the LUT 514 for storing the pre-distortion coefficients and the residual error coefficients calculated by the training unit 518.

More specifically, the training unit 518 primarily calculates pre-distortion coefficients by using a signal applied to the second closed loop in response to a training signal (e.g., a signal for initialization), and stores them in the LUT 514. Preferably, when the training unit 518 transfers the primarily calculated pre-distortion coefficients to the control unit 516, the control unit 516 stores them in the LUT 514. Thereafter, when the result pre-distorted by the combiners 510 and 512 by using the primarily calculated pre-distortion coefficients is outputted to the PA 524, a residual error occurs due to convergence limit of algorithm, LUT quantization noise and limit of processing means, ambient thermal noise of the PA, etc. The residual error thus occurred is applied to an open loop consisting of the service antenna 310, the donor antenna 300, and the feedback ICS 530, so that the channel estimator 506 of the feedback ICS 530 detects the residual error and transfers residual error information to the control unit 516. Then, the control unit 516 instructs the training unit 518 to calculate residual error coefficients based on the residual error information, and thus can receive calculated residual error coefficients and store them in the LUT 514 or in a separate table (not shown).

Figure 8:
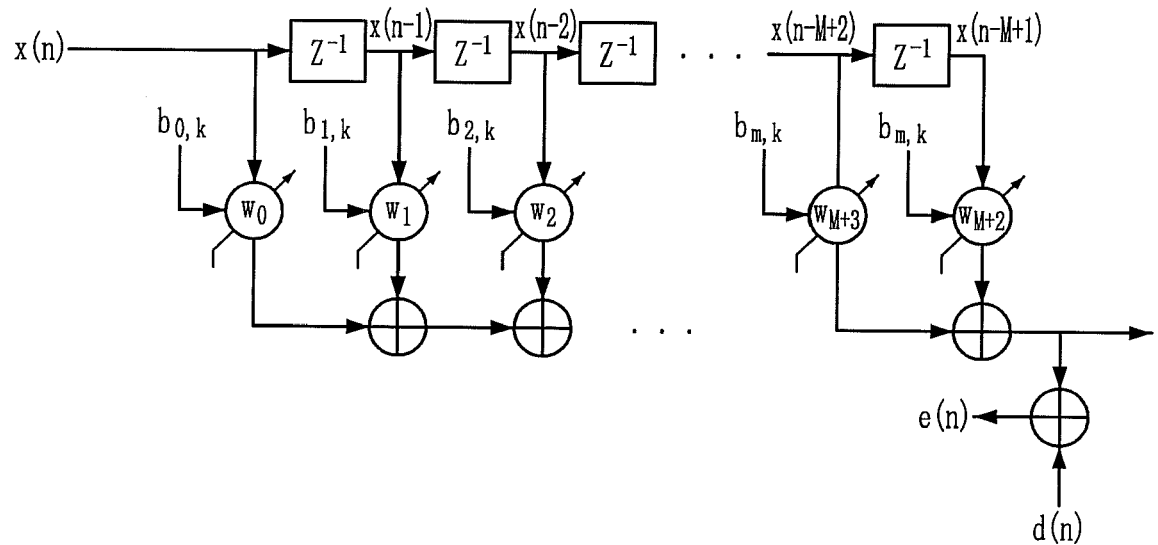
FIG. 8 is a block diagram showing an example of an algorithm of minimizing an error.

Referring to FIG. 8, there is provided a block diagram representing an example of an algorithm of minimizing an error. That is, FIG. 8 shows an example of an algorithm of finding a value for minimizing e(n) indicative of an error of $\hat{d}(n|x_n)$ value outputted by a desired value d(n) and a compensation coefficient wn with respect to an input sample x(n) so as to derive an optimal compensation coefficient wn. When e(n)=0, the desired compensation is made, so that the desired value becomes identical to the output.

By applying the algorithm of minimizing the error as above, the pre-distortion coefficients are primarily calculated in the second closed loop and the residual error coefficients are secondarily calculated by the open loop, to thus store each of them in the LUT 514 or the residual error coefficients in a separate table.

Meanwhile, after the initialization has been completed, the repeating system operates in an adaptive mode, and derives the magnitude of the digital baseband signal (I, Q) outputted from the AGC unit 508 and searches its corresponding pre-distortion coefficients from the LUT 514. The pre-distortion coefficients so searched and the output signal of the AGC unit 508 are multiplied by the first combiner 510 and added by the second combiner 512 for pre-distortion. The result is sent to the service antenna 310 through the RF converter 520 and the PA 524.

A part of the signal passing through the PA 524 is branched off through the coupler 526 and feedbacked, wherein its level is lowered by the attenuator 528 and converted into a digital baseband signal by the baseband converter 522 to form the first closed loop. The signal converted by the baseband converter 522 is trained by the training unit 518 to calculate a most optimal pre-distortion coefficient value, and the values stored in the LUT 514 are updated and the operation is continued in the adaptive mode.

Figure 7:
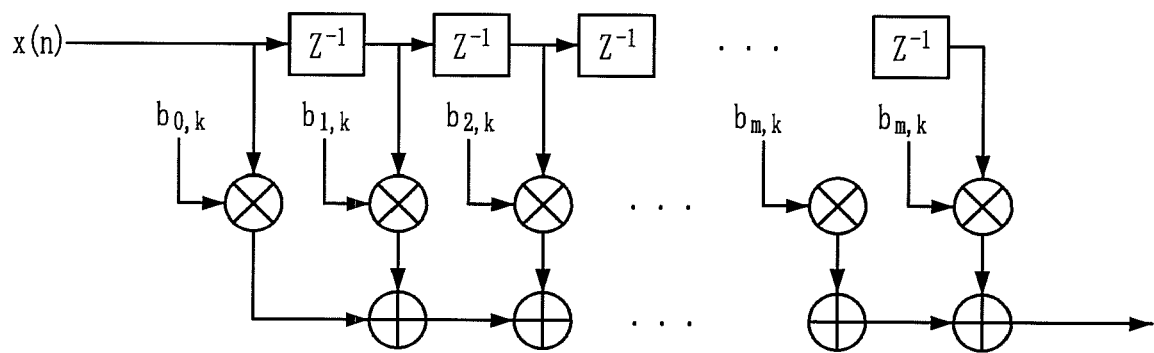
FIG. 7 is a detailed circuit diagram of the digital filter used in the present invention.

As mentioned above, the present invention is implemented by using the feedback ICS 530, a correlator in the pre-distorter 540, and a digital filter shown in FIG. 7 in order to precisely detect (or estimate or calculate) the feedback interference signal and the residual error, thereby calculating precise feedback interference cancellation coefficients (e.g., feedback interference signal information such as amplitude, phase, delay time, etc.), pre-distortion coefficients and residual error coefficients, and applying them for updating.

That is, the conventional PA linearization modeling technique including the pre-distorter and the PA has the limitation that has some degree of errors due to processing time, complexity of hardware or implementation, and the like. However, in accordance with the present invention, the feedback ICS 530 detects at a time a widespread residual error occurred, which is not processed by the pre-distorter 540, and provides residual error information to the control unit 516 and the pre-distorter 540 to update the LUT 514. By doing so, the feedback interference is cancelled and non-linear distortion of the PA is compensated for, which prevent oscillations by feedback of the RF repeater and improve the efficiency of the PA to reduce heat generated by the PA. As a result, this leads to the repeating system with economic, convenient maintenance, and high reliability.

Figure 6:
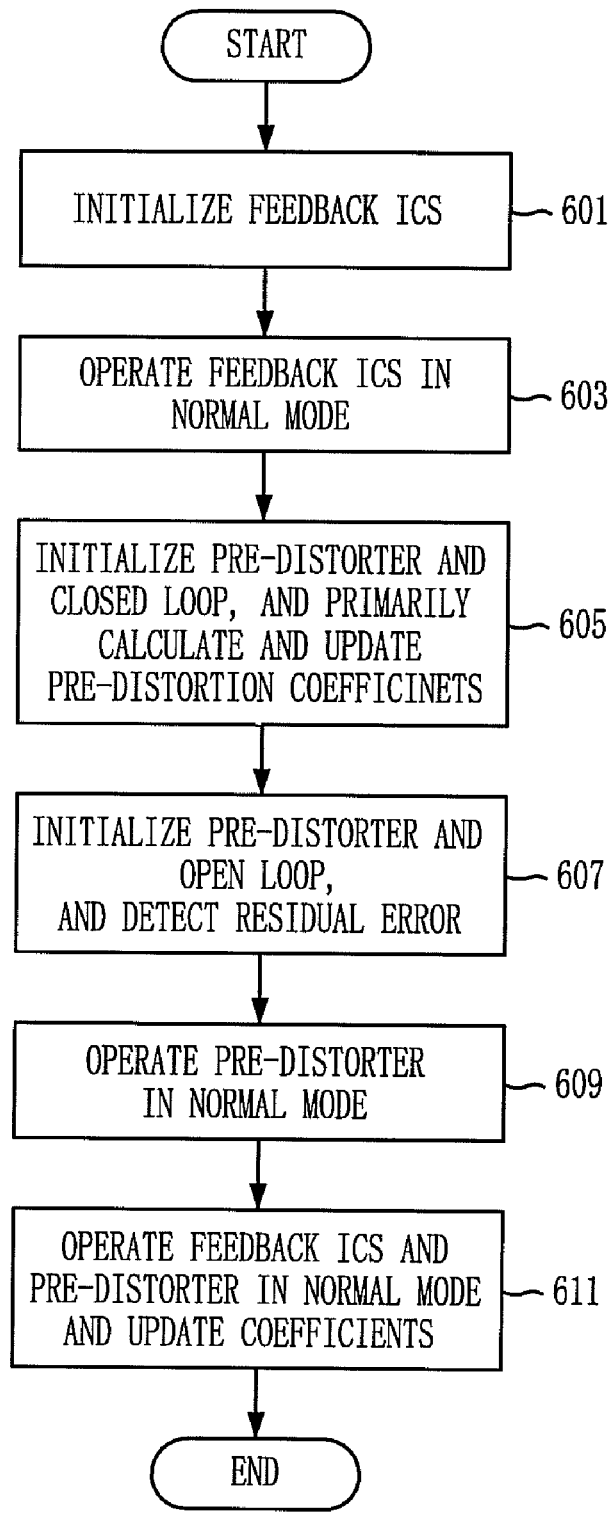
FIG. 6 is a flowchart describing an operation method of a repeating system for cancellation of a feedback interference signal with a pre-distortion function in accordance with another embodiment of the present invention.

FIG. 6 is a flowchart illustrating an operation method of a repeating system for cancellation of a feedback interference signal with a pre-distortion function in accordance with another embodiment of the present invention.

First, the process of the invention stops the operation of the pre-distorter 540 and initializes the feedback ICS 530, and then operates the feedback ICS 530 in normal mode to continuously update feedback interference cancellation coefficients in steps S601 and S603.

WM That is, the process stops the function of the pre-distorter 540 and performs initialization of the feedback ICS 530 in step S601. More concretely, the process stops the function of the pre-distorter 540, and calculates feedback interference cancellation coefficients required for cancellation of feedback interference for its initialization.

If the initialization has been finished in step S601, the process cancels the feedback interference signal while normally operating the feedback ICS 530 by using the calculated feedback interference cancellation coefficients, and normally operates the feedback ICS 530 while continuously updating the feedback interference cancellation coefficients in step S603.

Next, the process initializes the closed loop of the pre-distorter 540 to primarily derive pre-distortion coefficients and initializes the open loop while applying the pre-distortion based on the primary pre-distortion coefficients to obtain residual error information in steps S605 and S607.

In other words, when the feedback ICS 530 normally operates as mentioned above, the process initializes the pre-distorter 540, primarily calculates the pre-distortion coefficients through the closed loop by using training vector data of the pre-distorter 540, and stores them in the LUT 514. And then, the process operates the pre-distorter 540 by using the pre-distortion coefficients stored in the LUT 514 and applies the pre-distortion thereto to continuously update the pre-distortion coefficients stored in the LUT 514 while compensating for narrow thermal noise in step S605.

Thereafter, the process outputs the signal pre-distorted by the primarily calculated and updated pre-distortion coefficients through the PA 524 and initializes the open loop, so that the feedback ICS 530 can detect the residual error, and then the control unit 516 accepts the detected residual error in step S607.

Subsequently, the process converts the pre-distorter 540 into normal mode and updates the pre-distortion coefficients and the residual error in step 609.

That is, the process secondarily calculates residual error coefficients by using the accepted residual error information and stores them in the LUT 514. Then, it converts the pre-distorter 540 into normal mode, performs the pre-distortion function, at the same time continues to calculate the pre-distortion coefficients and the residual error, and continues to update the values of the LUT 514 in step S609.

The coefficients are naturally updated by making the feedback ICS 530 and the pre-distorter 540 operate in normal mode by the above procedure in step S611.

That is, the feedback ICS 530 and the pre-distorter 540 operate in normal mode, thereby continuously updating the feedback interference cancellation coefficients, the pre-distortion coefficients, and the residual error coefficients adaptively to operation environments in step 611.

Figure 9:
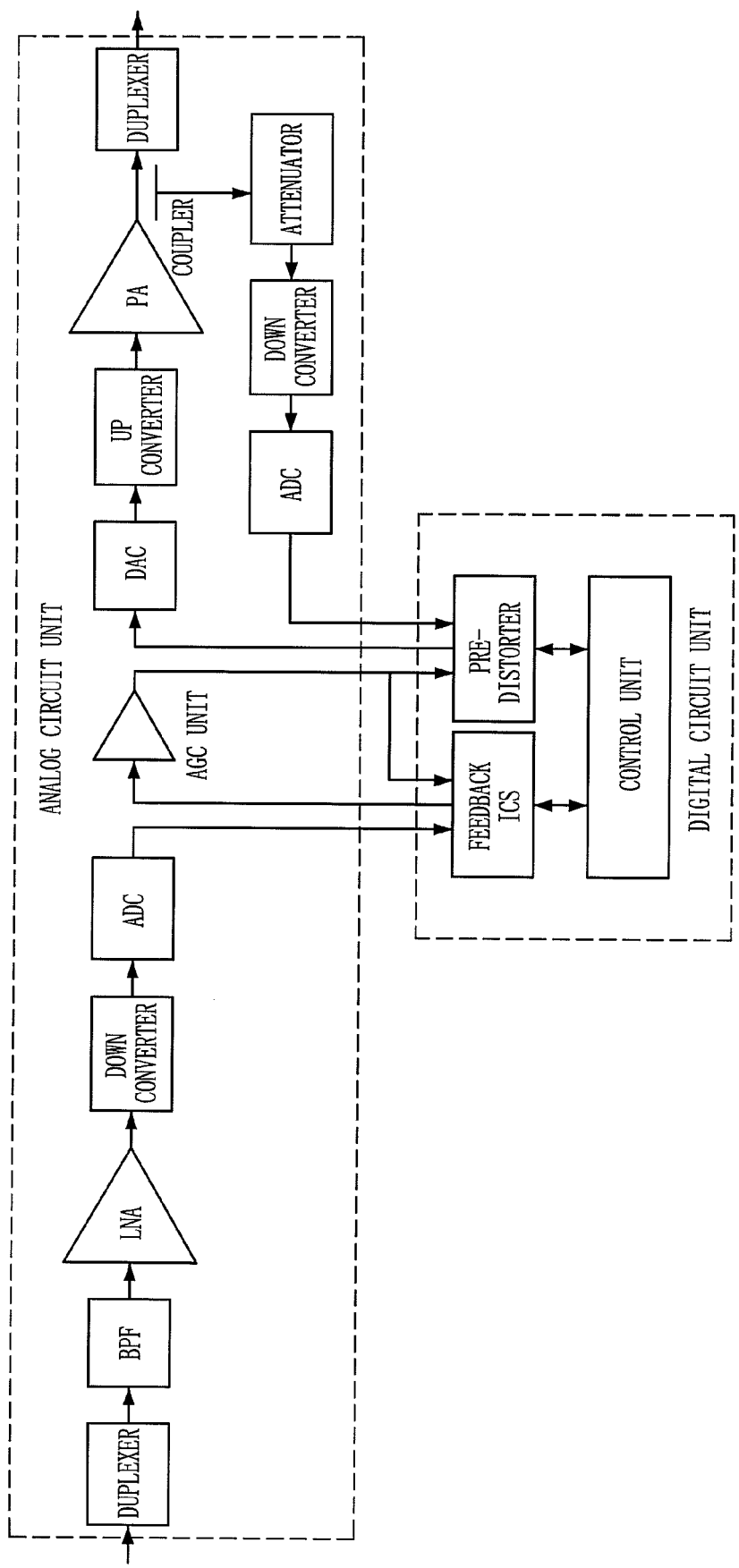
FIG. 9 is a diagram showing an analog circuit unit and a digital circuit unit of an acceptor.

FIG. 9 is a diagram showing an analog circuit unit and a digital circuit unit of an acceptor.

As shown in FIG. 9, the analog circuit unit including at least two of a duplexer, a BPF, an LNA, a down converter, an ADC, an AGC unit, a DAC, an up converter, a PA, and an attenuator is arranged in at least one first printed board; and the digital circuit unit including at least one of a feedback ICS, a pre-distorter, and a control unit is arranged in at least one second printed board. Further, a housing is divided into a plurality of acceptors by using a conductive accepting surface (that performs a radiant heat plate function) for radiating heat generated from the digital circuit unit and the analog circuit unit, and the digital circuit unit and the analog circuit unit are accepted in one acceptor for easy heat radiation from the conductive accepting surface.

At this time, the acceptor is configured in a polyhedron made of a conductive metal material and the inner part of the polyhedron is separately divided into more than two spaces by the conductive metal plate, one of the divided spaces accepting the analog circuit unit and the other one space freely accepting the digital circuit. In this structure, heat is radiated through at least one contact surface between the divided spaces.

Further, the acceptors are separately arranged on the board of the housing depending on the size, scale, and radiant heat efficiency of the repeating system for cancellation of a feedback interference signal.

The acceptors are disposed on the housing formed of the polyhedron made of a conductive member having a high conductivity, and one surface of the lower end, one or more surfaces or the cover of the housing is implemented with a conductive substrate with good thermal conduction for easy heat radiation, and the conductive accepting surface (that performs a radiant heat plate function) is attached to the rear surface of the conductive substrate, namely, at least one conductive accepting surface of the acceptor is in contact with the conductive substrate of the housing for heat radiation.

The structure and arrangement of the acceptor and the housing as set forth above will be described below more concretely.

As one example, in a forward circuit from a base station to a terminal, a first analog circuit unit including at least two components of a duplexer, a BPF, an LNA, a down converter, an ADC, an AGC unit, a DAC, an up converter, a PA, and an attenuator is arranged in at least one first printed board; and a first digital circuit unit including at least one of a feedback ICS, a pre-distorter, and a control unit is arranged in at least one second printed board. And, in a backward circuit from a terminal to a base station, a second analog circuit unit and a second digital circuit unit are also provided in the same configuration except that the signal direction is reverse.

As mentioned above, the forward/backward acceptors are composed of the analog circuit unit and the digital circuit unit. By the way, the digital circuit unit is connected by many lines because it is composed in the form of bus between the devices therein. Therefore, it is preferable to shorten the wiring and at the same time arrange the digital circuit unit separately from the analog circuit unit in order to minimize the effect of infinite harmonic signal generated by transiting from 1 to 0, and vice versa. On the other hand, since the analog circuit unit is connected by one line and gets much electric effect by its peripheral circuit devices or by connection lines, it is preferably implemented on a separate substrate from the digital circuit unit. Further, it is preferable that each substrate is accepted freely in one acceptor but separated therefrom.

In one example of the present invention, the forward/backward acceptors make a polyhedron (e.g., hexahedron) with a conductive metal material, and the inner part of the polyhedron is separately divided into two space layers where the analog circuit unit and the digital circuit unit are accepted in each layer, the layers being separated by a conductive metal plate serving as a radiant heat plate.

Among the components, the duplexer is composed of a plurality of analog devices in order to sharpen frequency cut-off characteristics, and is therefore preferable to be accepted in a separate acceptor from other components in order to isolate from an internal electric effect of the system. Since the amplifier generates much heat, it is also preferable to be accepted in a separate acceptor in order to effectively radiate heat.

Figure 10:
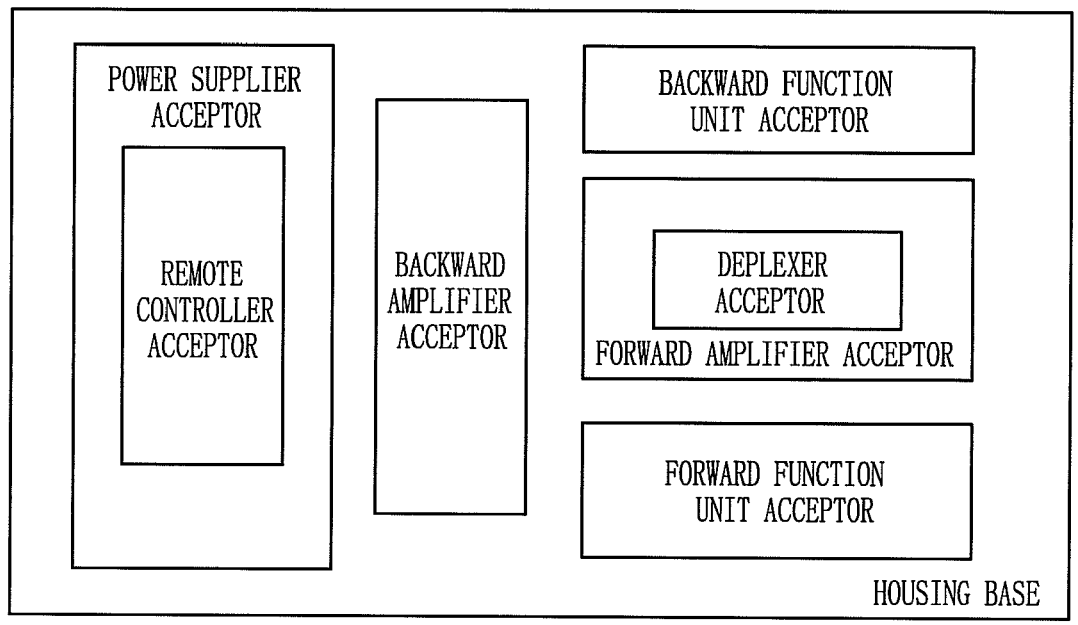
FIG. 10 is a view showing one example of an acceptor arrangement state arranged on the board of housing in accordance with the invention.

FIG. 10 is a view showing one example of an acceptor arrangement state disposed on the board of housing in accordance with the invention. In FIG. 10, if a sufficient space is not secured, the duplexer acceptor that is insensitive to heat is disposed at the upper end of the amplifier acceptor. And, a remote controller acceptor is disposed at the upper end of a power supplier acceptor. That is, at least some of the acceptors may be laminately disposed.

In other words, for easy maintenance of the repeating system of the invention, at least two of a forward function unit acceptor, a backward function unit acceptor, a power supplier acceptor, a duplexer acceptor, an amplifier acceptor, and a remoter controller acceptor may be laminately disposed.

Figure 11:
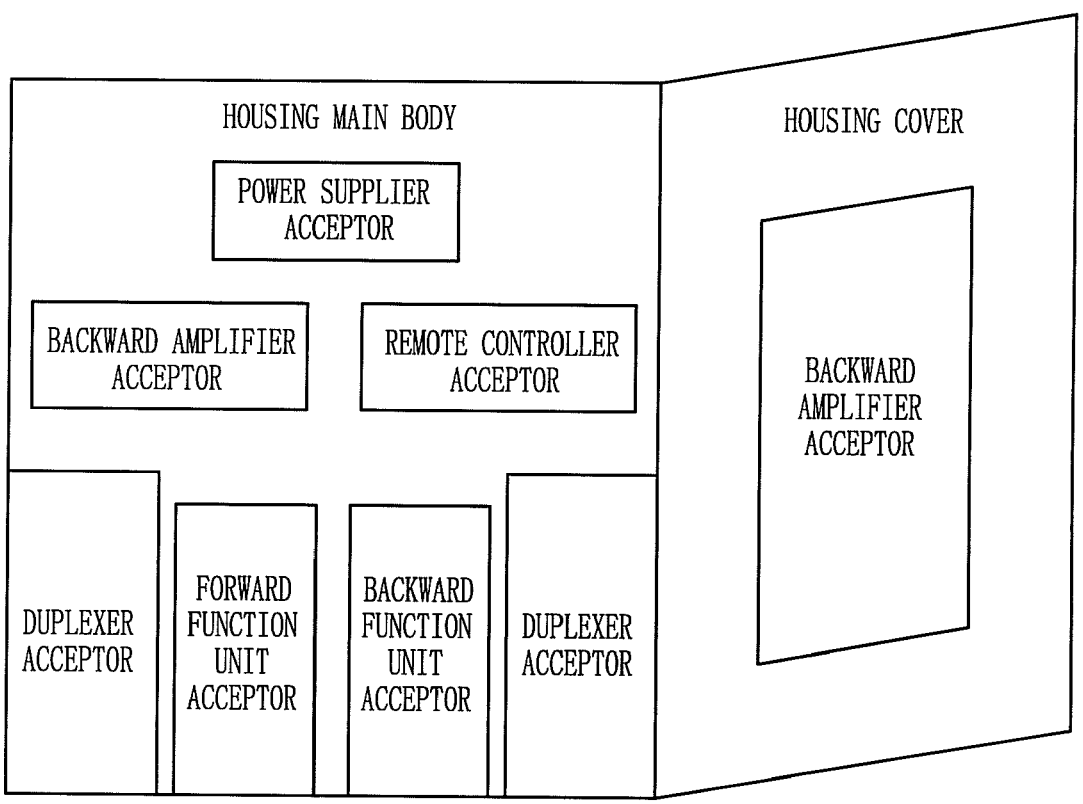
FIG. 11 is a view showing the structure of disposing an amplifier acceptor on a housing cover to effectively radiate heat in accordance with the present invention.

FIG. 11 is a view showing the structure of disposing an amplifier acceptor in a housing cover to effectively radiate heat in accordance with the present invention, especially an example where an amplifier acceptor is disposed in a housing cover to effectively radiate heat in order to secure a wide space of the housing main body and for a housing board and a wide space of each acceptor to be in contact with the housing.

In order to easily radiate heat as set forth above, at least one surface of the inside of the housing or housing cover of the repeating system is implemented with a conductive substrate with thermal conduction, a radiant heat plate is attached to the rear surface of the conductive substrate, and part of the polyhedral acceptor is in contact with the board of the housing for heat radiation.

That is, for easy heat radiation, in the repeating system, at least one surface of the lower end of the inside of the repeating system housing or the inside of the housing switch (cover) is implemented with a conductive substrate having a good thermal conduction, a radiant heat plate is attached to the rear surface of the conductive substrate, and at least two polyhedral acceptors of the forward function unit acceptor, the backward function acceptor, the power supplier acceptor, the duplexer acceptor, the amplifier acceptor, and the remote controller acceptor are in contact with the conductive substrate for heat radiation.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

The present application contains subject matter related to Korean Patent Application Nos, 2007-0018530 and 2007-0063887, filed in the Korean Intellectual Property Office on Feb. 23, 2007, and Jun. 27, 2007, respectively, the entire contents of which is incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A repeating system for cancellation of a feedback interference signal, comprising:
   a power amplifier (PA) for power-amplifying an output signal;
   a feedback interference cancellation system (ICS) for outputting a first output signal, canceling a feedback interference signal in the first output signal, detecting a residual error in the first output signal of the feedback ICS, and outputting a second signal indicating information on the residual error;
   a pre-distorter for receiving the first output signal of the feedback ICS, compensating for an error of the PA by applying pre-distortion and compensating for the residual error by using the information on the residual error to linearize characteristics of the PA; and
   a control unit for controlling the feedback ICS and the pre-distorter, wherein the control unit is configured to receive the second output signal of the feedback ICS and control the pre-distorter to perform the compensating of the residual error in response to the received second output signal of the feedback ICS and wherein the canceling of the feedback interference signal in the first output signal by the feedback ICS is separate and different from the compensating of the residual error by the pre-distorter.

2. The repeating system of claim 1, wherein the pre-distorter primarily compensates for a non-linear characteristic of the PA by applying pre-distortion through an internal closed loop and secondarily compensates for the residual error which is not compensated by the primary pre-distortion by using the information on the residual error detected by the feedback ICS to linearize the characteristic of the PA.

3. The repeating system of claim 2, wherein the feedback ICS processes a feedback interference signal for cancellation thereof, detects a residual error that remains after primary compensation by the pre-distorter through an open loop, and provides residual error information to the pre-distorter through the control unit as control information.

4. The repeating system of claim 1, wherein the control unit is implemented with one controller which communicates control data and control signals between the feedback ICS and the pre-distorter, and controls the feedback ICS and the pre-distorter.

5. The repeating system of claim 1, wherein the pre-distorter includes:
   an RF converter for converting a signal from a combiner into an RF signal to provide a converted signal to the PA;
   a coupling means for branching off and feedbacking part of the output signal of the PA;
   an attenuator for attenuating a feedback signal which is branched off and feedbacked by the coupling means;
   a first baseband converter for converting the RF signal attenuated by the attenuator into a baseband signal;
   a training unit for calculating pre-distortion coefficients by using an output signal of the first baseband converter and an output signal of the combiner, and calculating residual error coefficients based on the residual error information provided from the feedback ICS through the control unit;
   a storing means for storing the pre-distortion coefficients and the residual error coefficients calculated by the training unit; and
   the combiner for combining the pre-distortion coefficients or the residual error coefficients stored in the storing means and an output signal from an automatic gain control (AGC) unit of the feedback ICS.

6. The repeating system of claim 5, wherein the training unit primarily calculates the pre-distortion coefficients by using a signal passing through the internal closed loop upon receipt of a training signal (which is a signal for initialization), and stores the same in the storing means through the control unit; and
   secondarily calculates the residual error coefficients so that the residual error is minimized by reception of the residual error information detected by the feedback ICS through the control unit, and stores the same in the storing means through the control unit.

7. The repeating system of claim 5, wherein the combiner multiplies, in a first combiner, the coefficients searched from the storing means depending on the magnitude of the output signal from the AGC unit by the output signal from the AGC unit, and adds the multiplication result for pre-distortion in a second combiner.

8. The repeating system of claim 5, wherein the feedback ICS includes:
   a second baseband converter for converting a received signal into a baseband signal;
   the AGC unit for automatically adjusting the magnitude of an output signal of a relay signal to be relayed;
   a channel estimator for detecting for estimating) feedback interference signal information by using the baseband signal from the second baseband converter and the feedback signal from the AGC unit, detecting the residual error that remains after primary compensation by the pre-distorter, and delivering the residual error information to the control unit;
   an interference cancellation signal generator for generating an interference cancellation signal based on the feedback interference signal information detected by the channel estimator and the feedback signal from the AGC unit; and
   a feedback interference signal cancellator for canceling the feedback interference signal existing in the baseband signal from the baseband converter by using the interference cancellation signal from the interference cancellation signal generator and delivering the remaining baseband signal after the cancellation to the AGC unit.

9. An operation method of a repeating system for cancellation of a feedback interference signal, comprising the steps of:
   a) stopping the operation of a pre-distorter while initializing a feedback interference cancellation system (ICS) and while operating the feedback ICS in normal mode to continuously update feedback interference cancellation coefficients;
   b) initializing a closed loop of the pre-distorter and primarily calculating pre-distortion coefficients, and initializing an open loop while applying pre-distortion by using the calculated pre-distortion coefficients to acquire residual error information; and
   c) converting the pre-distorter into normal mode to update the pre-distortion coefficients and the residual error coefficients.

10. The operation method of a repeating system of claim 9, further comprising the step of:
- d) continuously updating the feedback interference cancellation coefficients, pre-distortion coefficients, and residual error coefficients adaptively to environments while the feedback ICS and the pre-distorter operate in normal operation.

11. The repeating method of claim 9, wherein the step a) includes the steps of:
- a1) stopping the functions of the pre-distorter;
- a2) calculating the feedback interference cancellation coefficients required for cancellation of the feedback interference signal and performing the initialization of the feedback ICS; and
- a3) canceling the feedback interference signal while normally operating the feedback ICS by using the calculated feedback interference cancellation coefficients, and normally operating the feedback ICS while continuously updating the interference cancellation coefficients.

12. The repeating method of claim 9, wherein the step b) includes the steps of:
- b1) initializing the pre-distorter;
- b2) primarily calculating the pre-distortion coefficients through the closed loop by using training vector data of the pre-distorter and storing the calculated pre-distortion coefficients in a look-up table (LUT);
- b3) operating the pre-distorter by using the pre-distortion coefficients stored in the LUT and continuously updating the pre-distortion coefficients in the LUT while compensating for nonlinearity by applying pre-distortion; and
- b4) outputting a signal pre-distorted by the primarily calculated and updated pre-distortion coefficients through a PA, and initiating the open loop and detecting the residual error from the feedback ICS to derive the residual error information.

13. The repeating method of claim 12, wherein the step c) includes the steps of:
- c1) secondarily calculating residual error coefficients by using the derived residual error information and storing them in the LUT; and
- c2) converting the pre-distorter into normal operation mode and continuously calculating pre-distortion coefficients and residual error coefficients along with execution of pre-distortion function, to continuously update the values of the LUT.

14. A repeating system for cancellation of a feedback interference signal, comprising:
- a power amplifier (PA) for power-amplifying an output signal;
- a feedback interference cancellation system (ICS) for outputting a first output signal, receiving the first output signal as a feedback signal, canceling a feedback interference signal existing in the first output signal of the feedback ICS, detecting an error in the first output signal by using the feedback signal, and outputting a second signal indicating the error;
- a pre-distorter for receiving the first output signal of the feedback ICS, compensating for the error in the first output signal, and compensating for nonlinearity of the PA by using pre-distortion to linearize characteristics of the PA; and
- a control unit for controlling the feedback ICS and the pre-distorter, wherein the control unit is configured to receive the second output signal of the feedback ICS and control the pre-distorter to perform the compensating of the residual error in response to the received second output signal of the feedback ICS and wherein the canceling of the feedback interference signal in the first output signal by the feedback ICS is separate and different from the compensating of the error in the first output signal by the pre-distorter.

15. The repeating system of claim 14, wherein the control unit is implemented with one digital signal processor for controlling the feedback ICS and the pre-distorter.

16. A non-transitory computer-readable recording medium that records a software program of implementing an operation method of a repeating system having a processor for cancellation of a feedback interference signal, comprising the functions of:
- stopping the operation of a pre-distorter while initializing a feedback ICS and while operating the feedback ICS in normal mode to continuously update feedback interference cancellation coefficients;
- initializing a closed loop of the pre-distorter and primarily calculating pre-distortion coefficients, and initializing an open loop while applying the pre-distortion by using the calculated pre-distortion coefficients to acquire residual error information; and converting the pre-distorter into normal mode and updating the pre-distortion coefficients and residual error coefficients.

17. The computer-readable storage medium of claim 16, further comprising the function of:
- continuously updating the feedback interference cancellation coefficients, pre-distortion coefficients, and residual error coefficients adaptively to environments while the feedback ICS and the pre-distorter operate in the normal operation.

* * * * *